United States Patent
Omae et al.

(10) Patent No.: US 7,492,738 B2
(45) Date of Patent: Feb. 17, 2009

(54) MOBILE NODE, MOBILE COMMUNICATION SYSTEM, COMMUNICATION CONTROL METHOD AND ACCESS ROUTER

(75) Inventors: Koji Omae, Yokohama (JP); Hideaki Takahashi, Yokohama (JP); Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 495 days.

(21) Appl. No.: 10/882,249

(22) Filed: Jul. 2, 2004

(65) Prior Publication Data

US 2005/0041607 A1    Feb. 24, 2005

(30) Foreign Application Priority Data

Jul. 2, 2003    (JP)    ............ P2003-190541

(51) Int. Cl.
*H04Q 7/00* (2006.01)
*H04Q 7/24* (2006.01)
*H04B 7/00* (2006.01)

(52) U.S. Cl. ............... 370/331; 370/310; 370/331
(58) Field of Classification Search ......... 370/310, 370/331, 338
See application file for complete search history.

(56) References Cited

U.S. PATENT DOCUMENTS

| | | | |
|---|---|---|---|
| 2004/0004967 A1* | 1/2004 | Nakatsugawa et al. | 370/400 |
| 2004/0081122 A1* | 4/2004 | Koodli et al. | 370/329 |
| 2005/0020265 A1* | 1/2005 | Funabiki et al. | 455/436 |
| 2006/0193272 A1* | 8/2006 | Chou et al. | 370/310 |
| 2006/0209760 A1* | 9/2006 | Saito et al. | 370/331 |

OTHER PUBLICATIONS

Yu Rui, et al., "Seamless Handover in WLAN", Journal of Nanjing University of Posts and Telecommunications, (Natural Science), vol. 22, No. 1, Nanjing 210003 China, Mar. 2002, pp. 1-9.

D. Johnson, et al., IFTF Mobile IP Working Group, Internet-Draft, pp. 1-100, "Mobility Support in IPv6", Feb. 26, 2003.

(Continued)

*Primary Examiner*—Barry W Taylor
(74) *Attorney, Agent, or Firm*—Oblon, Spivak, McClelland, Maier & Neustadt, P.C.

(57) ABSTRACT

A mobile node (MN) transmits a (4) echo request to the effect that the source address is set to be a new care of address (nCoA) right after transmitting a (3) binding update (BU) for a home agent (HA). The nAR having received the (4) echo request intends to transmit an echo reply to the nCoA being the source address of the echo request. However, at this time, since an entry regarding the nCoA does not exist in a neighbor cache of the nAR, the nAR transmits (5) neighbor solicitation (NS) to the MN, and generates a neighbor cache entry of the nCoA. After this, at the time when a binding acknowledgment (BA) has arrived at the nAR, since the entry of the nCoA exists, the (8) BA and data packets (9) to (11) arriving at the nAR following the (8) BA are transferred to the MN without buffering in the nAR, corresponding to the entry of the nCoA generated at the time of transmission of the (7) echo reply.

2 Claims, 9 Drawing Sheets

OTHER PUBLICATIONS

T. Narten, et al., Network Working Group, Request for Comments: 2461, pp. 1-93, "Neighbor Discovery for IP Version 6 (IPv6)", Dec. 1998.

H. Soliman, et al., IETF Mobile IP Working Group, Internet-Draft, pp. 1-29, "Hierarchical Mobile IPv6 Mobility Management (HMIPv6)", Oct. 2002.

A. Conta, et al., Network Working Group, Request for Comments: 2463, pp. 1-18, "Internet Control Message Protocol (ICMPv6) for the Internet Protocol Version 6 (IPv6) Specification", Dec. 1998.

C. Perkins, Editor, Network Working Group, Request for Comments: 2002, pp. 1-79, "IP Mobility Support", Oct. 1996.

J. Solomon, et al., Network Working Group, Request for Comments: 2290, pp. 1-17, "Mobile-VPv4 Configuration Option for PPP IPCT", Feb. 1998.

Rajeev Koodli et al., Internet Draft: Fast Handovers in Mobile OPv6, draft-koodli-mobileip-fastv6-02.txt, Mar. 2001, on Internet, Searched on Nov. 16, 2007, URL: http://www.watersprings.org/pub/id/draft-koodli-mobileip-fastv6-02.txt.

* cited by examiner

BACKGROUND ART

BACKGROUND ART

Fig.9

```
                    Neighbor cache entry
   (MAC ADDRESS)     (IP ADDRESS)              (STATE)
   00-07-40-56-ee-87, 2001:23::200:e2ff:fe56:ee87 STALE
         :                  :                     :
```

MOBILE NODE, MOBILE COMMUNICATION SYSTEM, COMMUNICATION CONTROL METHOD AND ACCESS ROUTER

BACKGROUND OF THE INVENTION

1. Field of the Invention

The present invention relates to a mobile node used in a mobile communication system including a plurality of access routers (hereinafter also referred to as "ARaccess router)) for providing a wireless link to a mobile node in a predetermined area, with mobility control being executed based on a mobile IP or its extended system, wherein any one of said access routers provides a wireless link to the mobile node (hereinafter also referred to as "MN" (mobile node)). Furthermore the present invention refers to the aforementioned mobile communication system, a communication control method, and the aforementioned access router.

2. Related Background Art

FIG. 1 is a sequence chart showing operation at the time of handoff of a MN based on non-patent documents 1 and 2 mentioned hereinafter. In FIG. 1, the sequence chart, at the time when a MN has executed handoff from an AR (hereinafter referred to as an oAR (old AR), not shown) to which the MN has been connected until immediately before the handoff to a new AR (hereinafter referred to as an nAR (new AR)) to which the MN has been newly connected, is shown. As shown in FIG. 1, after the handoff (L2 handoff) of the link layer, the MN receives a router advertisement message (2) (hereinafter referred to as RA (router advertisement)) from the nAR. As shown in FIG. 1, in order to receive the RA quickly, the MN can transmit a router solicitation message (1) (hereinafter referred to as RS (router solicitation)) to the nAR.

The MN having received the (2) RA generates a new care of address (hereinafter referred to as nCoA (new care of address)) and transmits a binding update message (3) (hereinafter referred to as BU (binding update)) to a mobility control node (home agent (HA) or mobility anchor point (MAP)). Herewith, the destination is the HA at the mobility control based on the mobile IP and the destination is the MAP at the mobility control based on the hierarchical mobile IP (refer to a non-patent document 3 mentioning later).

The HA or the MAP returns a binding acknowledgement message (4) (hereinafter referred to as BA (binding acknowledgement)) to the BU (3). The nAR having received the (4) BA intends to accomplish routing (transferring), the (4) BA, however, a neighbor cache entry of the nCoA being the destination address does not exist at this moment, so that the nAR can find no MAC address of the nCoA. Therefore, the nAR temporarily stores the BA and inquires the MAC address of a node having the address of the nCoA by transmitting a neighbor solicitation message (5) (hereinafter referred to as NS (neighbor solicitation)).

The MN having received the (5) NS informs the nAR of the MAC address by transmitting a neighbor advertisement message (hereinafter referred to as NA (neighbor advertisement)). The nAR having received the (6) NA generates the neighbor cache entry of the nCoA and transmits the (4) BA, which has been stored temporarily to the MN.

[Non-Patent Document 1] IETF Internet Draft "Mobility Support in IPv6" draft-ietf-mobileip-ipv6-21.txt

[Non-Patent Document 2] IETF RFC2461 "Neighbor Discovery for IP Version 6 (IPv6)"

[Non-Patent Document 3] IETF Internet Draft "Hierarchical Mobile IPv6 mobility management (HMIPv6)" draft-ietf-mobileip-hmipv6-07.txt, October 2002 (work in progress)

[Non-Patent Document 4] IETF RFC2463 "Internet Control Message Protocol (ICMPv6) for the Internet Protocol Version 6 (IPv6) Specification"

SUMMARY OF THE INVENTION

However, at the conventional technologies mentioned above, in the case where the nAR intends to transfer the BA to the MN at the time when the nAR has retained no neighbor cache entry of the nCoA, the NS transmitting process and the NA receiving process are required, in order to solve the MAC address of the nCoA on the nAR. During executing these processes, the nAR is required to buffer temporarily the BA and packets following the BA to be transferred to the nCoA of the MN. Therefore, by the temporary buffering, there is a possibility that the transmission delay value of the packet of the BA and the packets following the BA to be transferred the nCoA of the MN increases.

Also, in the case where the amount of the packets to be buffered has exceeded the buffer capacity of the nAR, the head packet in the buffer is discarded, every time when a following packet arrives. Consequently, by the temporary buffering mentioned above, there is a possibility that a packet loss occurs, in addition to the increase of the transmission delay value.

FIG. 2 is a sequence chart showing the generation of packet transmission-delay and packet loss by temporary buffering at the conventional technology. In FIG. 2, following the (4) BA, data packets (7) to (13) destined for the nCoA arrive at the nAR. In order to transfer the (4) BA, the nAR generates the neighbor cache entry of the nCoA by executing the (5) NS transmission and the (6) NA reception. However, since the data packets destined for the nCoA arrive during the generation of the neighbor cache entry, the nAR buffers these data packets.

At this time, in the case where the buffer capacity of the nAR is three as large as a general value, as shown in FIG. 2, the (4) BA is discarded when the data packet (9) arrive, the data packet (7) is discarded when the data packet (10) arrive and the data packet (8) is discarded when the data packet (11) arrives respectively. And the data packets (9) to (11) are transferred to the MN but have been buffered until the generation of the neighbor cache entry of the nCoA on the nAR, therefore, the transmission delay value becomes large. As mentioned above, at the conventional technology, there are problems that the transmission delay value increases and the packet loss occurs at the first some packets arriving at the nCoA, after the handoff of the MN.

It is therefore an object of the present invention to provide a mobile node, a mobile communication system, a communication control method, and an access router, whereby the increase of the transmission delay and the occurrence of the packet loss caused by the MAC address solution on the nAR are avoided.

It is assumed that the neighbor cache entry of the nCoA has already existed at the time when the BA arrives at the nAR. The sequence chart to be plotted under this assumption is shown in FIG. 3. As shown in FIG. 3, if the neighbor cache entry of the nCoA has already existed at the time when the (4) BA arrives at the nAR, it is understandable that the (4) BA and the data packets (5) to (7) following the (4) BA are transferred to the MN without the transmission delay and the packet loss. Therefore, according to the present invention, a technical means, whereby the neighbor cache entry of the nCoA is generated after the handoff of the MN and before arrival of the packet destined for the nCoA at the nAR, has been devised. Thereby, the above-mentioned problems are solved.

To attain the above-mentioned object, according to the present invention, as described in the claim 1, there is provided a mobile node used in a mobile communication system including a plurality of access routers for providing a wireless link to a mobile node in a predetermined area, with mobility control being executed based on a mobile IP or its extended system wherein any one of said access routers provides a wireless link to said mobile node. The mobile node comprises a new care of address generating means for generating a new care of address in consequence of the change in an access router providing a wireless link to the mobile node, taking place when the mobile node has moved across an area; and a first generation/transmission means for generating a first message packet requesting a reply to a source in which the generated new care of address has been set to be a source address, and for transmitting the first message packet to any of nodes.

At this mobile node, on generation of a new care of address, by the new care of address generating means, in consequence of the change in an access router providing a wireless link to the mobile node taking place when the mobile node has moved across an area, a first generation/transmission means generates a first message packet requesting a reply to a source in which the generated new care of address has been set to be a source address, and transmits the first message packet to any of nodes. As mentioned above, the operation, wherein there is transmitted the first message packet to any of the nodes with the aim of effecting the generation of the neighbor cache entry (correspondence between the IP address and the MAC address of the mobile node) of the new care of address (nCoA) on the nAR (new access router), exists in no existing protocol. This operation is not a usual and well-known technique, but, a distinctive operation characteristic of the present invention, and is linked with an inventive step.

By the operation mentioned above, the node having received the first message packet transmits a reply to the source (new care of address) for the request of the reply. At this time, the access router, to which the mobile node has been newly connected (newly connected access router), transmits the reply to the mobile node or relays a reply from other node to the mobile node. At this time, the newly connected access router stores the correspondence between the IP address and the MAC address of the mobile node, as the operation based on the IETF RFC2461 "Neighbor Discovery for IP Version 6 (IPv6)".

Therefore, the newly connected access router does not need to execute the MAC address solution newly, which has been executed conventionally, at the time when the access router transfers the binding acknowledgment message and the data packets to the mobile node. With this, the increase of the transmission delay and the occurrence of the packet loss caused by the MAC address solution at the newly connected access router can be avoided.

As described in one embodiment, it is desirable that the first generating and transmitting means generates an echo request message as the first message packet and transmits the message to the newly connected access router. That is, as the first message packet, the echo request message defined in the IETF RFC2463 "Internet Control Message Protocol (ICMPv6) for the Internet Protocol Version 6 (IPv6) Specification" can be used, without taking the pains to define a new message. And by transmitting the first message packet to the newly connected access router (that is, the access router to which the mobile node has been connected directly), the access router can receive the first message packet quickly and surely, and can store the correspondence between the IP address and the MAC address of the mobile node quickly and surely.

The present invention can be interpreted as the invention regarding a mobile communication system and a communication control method.

According to the present invention, there is provided a mobile communication system. The mobile communication system is a mobile communication system including a mobile node and a plurality of access routers for providing a wireless link to a mobile node in a predetermined area with mobility control being executed based on a mobile IP or its extended system. And the mobile node provides a new care of address generating means for generating a new care of address corresponding to the change in an access router providing a wireless link to the mobile node when the mobile node has moved across an area, and a first generating and transmitting means for generating a first message packet that requests a reply for a source in which the generated new care of address has been set to be a source address, and for transmitting the first message packet to any of nodes. And the access router provides a first correspondence storage means for storing the correspondence between an IP address and a MAC address of a mobile node being connected to the access router, at the time when the access router has received the first message packet from the mobile node to which the access router provides a wireless link or when the access router has relayed the reply addressed to the mobile node to which the access router provides the wireless link.

According to the present invention, there is provided a communication control method. The communication control method is a communication control method in a mobile communication system including a mobile node and a plurality of access routers for providing a wireless link to a mobile node in a predetermined area with mobility control being executed based on a mobile IP or its extended system. And the communication control method provides the steps of generating a new care of address by a mobile node in case of a change in an access router providing a wireless link to the mobile node, taking place due to the fact that the mobile node has moved across an area, generating a first message packet that requests a reply for a source in which the generated new care of address has been set to be a source address, and transmitting the first message packet to any of nodes by the mobile node, and storing the correspondence between an IP address and a MAC address of the mobile node, in the case where an access router to which the mobile node has been newly connected, has received the first message packet from the mobile node or relayed the reply for the mobile node by the access router.

According to the present invention, for achieving the object mentioned above, the mobile node is able to have the following structure. The mobile node is a mobile node in a mobile communication system including a plurality of access routers for providing a wireless link to a mobile node in a predetermined area with mobility control being executed based on a mobile IP or its extended system, wherein any of the access routers provides a wireless link to the mobile node The mobile node comprises a new care of address generating means for generating a new care of address corresponding to the change in an access router providing a wireless link to the mobile node when the mobile node has moved across an area, and a second generating and transmitting means for generating a second message packet that requests to store the correspondence between an IP address and a MAC address of the source of its own packet in which the generated new care of address has been set to be a source address, and for transmitting the second message packet to an access router to which the mobile node has been newly connected.

At this mobile node, in the case where the new care of address generating means generates a new care of address corresponding to the change in an access router providing a wireless link to the mobile node when the mobile node has moved across an area, the second generating and transmitting means generates a second message packet that requests to store the correspondence between an IP address and a MAC address of the source of its own packet in which the generated new care of address has been set to be a source address, and transmits the second message packet to an access router to which the mobile node has been newly connected. As mentioned above, the operation, which transmits the second message packet to the newly connected access router in order to generate the neighbor cache entry (correspondence between the IP address and the MAC address of the mobile node) of the new care of address (nCoA) on the nAR (new access router), does not exist in the existing protocol. This operation is a distinctive operation characteristic of the present invention.

By the operation mentioned above, the access router having received the second message packet (that is, the access router to which the mobile node has been newly connected) stores the correspondence between the IP address and the MAC address of the mobile node, in response to the request on storing the correspondence.

Therefore, the newly connected access router does not need to execute the MAC address solution newly, which has been executed conventionally, at the time when the access router transfers the binding acknowledgment message (BA) and the data packets to the mobile node. With this, the increase of the transmission delay and the occurrence of the packet loss caused by the MAC address solution at the newly connected access router can be avoided.

As described in one embodiment, it is desirable that the second generating and transmitting means generates a neighbor solicitation message (NS), which is generally used at the time of neighbor discovery, as the second message packet. That is, as the second message packet, the neighbor solicitation message stipulating in the IETF RFC2461 "Neighbor Discovery for IP Version 6 (IPv6)" can be used, without consuming power to stipulate a new message.

The present invention can be interpreted as the invention regarding a mobile communication system and a communication control method.

According to the present invention, there is provided a mobile communication system. The mobile communication system is a mobile communication system including a mobile node and a plurality of access routers for providing a wireless link to a mobile node in a predetermined area with mobility control being executed based on a mobile IP or its extended system. And the mobile node comprises a new care of address generating means for generating a new care of address corresponding to the change in an access router providing a wireless link to the mobile node when the mobile node has moved across an area, and a second generating and transmitting means for generating a second message packet that requests to store the correspondence between an IP address and a MAC address of the source of its own packet in which the generated new care of address has been set to be a source address, and for transmitting the second message packet to an access router to which the mobile node has been newly connected. And the access router provides a second correspondence storage means for storing the correspondence between an IP address and a MAC address of a mobile node being connected to the access router, at the time when the access router has received the second message packet from the mobile node to which the access router provides a wireless link.

According to the present invention, there is provided a communication control method. The communication control method is a communication control method in a mobile communication system including a mobile node and a plurality of access routers for providing a wireless link to a mobile node in a predetermined area with mobility control being executed based on a mobile IP or its extended system. And the communication control method comprises the steps of generating a new care of address by a mobile node in the case where an access router providing a wireless link to the mobile node has been changed due to the fact that the mobile node has moved across an area, generating a second message packet that requests on storing store the correspondence between an IP address and a MAC address of the source of its own packet in which the generated new care of address has been set to be a source address, and transmitting the second message packet to an access router to which the mobile node has been newly connected by the mobile node, storing the correspondence between an IP address and a MAC address of the mobile node, in the case where an access router to which the mobile node has been newly connected, has received the second message packet from the mobile node by the access router.

According to the present invention, as an access router, the following access router whose structure is improved is effective. This access router is an access router in a mobile communication system including a plurality of access routers with mobility control being executed based on a mobile IP or its extended system, wherein the access router provides a wireless link to a mobile node in a predetermined area. The access router comprises a third correspondence storage means for storing the correspondence between an IP address and a MAC address of the mobile node at the time when the access router relayed a binding update (BU) message from the mobile node to which the access router provides a wireless link.

In this case, when the mobile node generates a new care of address due to the fact that the mobile node has moved across an area, the mobile node transmits a binding update message. At the newly connected access router, the third correspondence storage means store the correspondence between an IP address and a MAC address of the mobile node at the time when the access router relayed the binding update message. This operation does not exist in the existing protocol, and is a distinctive operation characteristic of the present invention.

Therefore, the newly connected access router does not need to execute the MAC address solution newly, which has been executed conventionally, at the time when the access router transfers the binding acknowledgment message (BA) and the data packets to the mobile node. With this, the increase of the transmission delay and the occurrence of the packet loss caused by the MAC address solution at the newly connected access router can be avoided.

According to the present invention, the present invention can be interpreted as the invention relating to a communication control method. The communication control method is a communication control method in a mobile communication system including a mobile node and a plurality of access routers for providing a wireless link to a mobile node in a predetermined area with mobility control being executed based on a mobile IP or its extended system. The communication control method comprises the steps of generating a new care of address by a mobile node in the case where an access router providing a wireless link to the mobile node has been changed due to the fact that the mobile node has moved across an area, transmitting a binding update message by the mobile node at the time when the new care of address has been generated, and storing the correspondence between an IP address and a MAC address of the mobile node at the time when an access router to which the mobile node has been newly connected relayed the binding update message by the access router.

As explained above, according to the present invention, it is not necessary for a newly connected access router to solve the MAC address newly, which is executed conventionally, at the time when the binding acknowledgement message and the data packets addressed to a mobile node are transferred. Therefore, the increase of the transmission delay and the occurrence of the packet loss caused by the MAC address solution in the newly connected access router can be avoided.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given byway of illustration only, since various changes and modifications within the spirit and scope of the invention will become apparent to those skilled in the art from this detailed description.

BRIEF DESCRIPTION OF THE DRAWINGS

FIG. 9 is a diagram showing an example of a neighbor cache entry.

DESCRIPTION OF THE PREFERRED EMBODIMENTS

Figure 1:
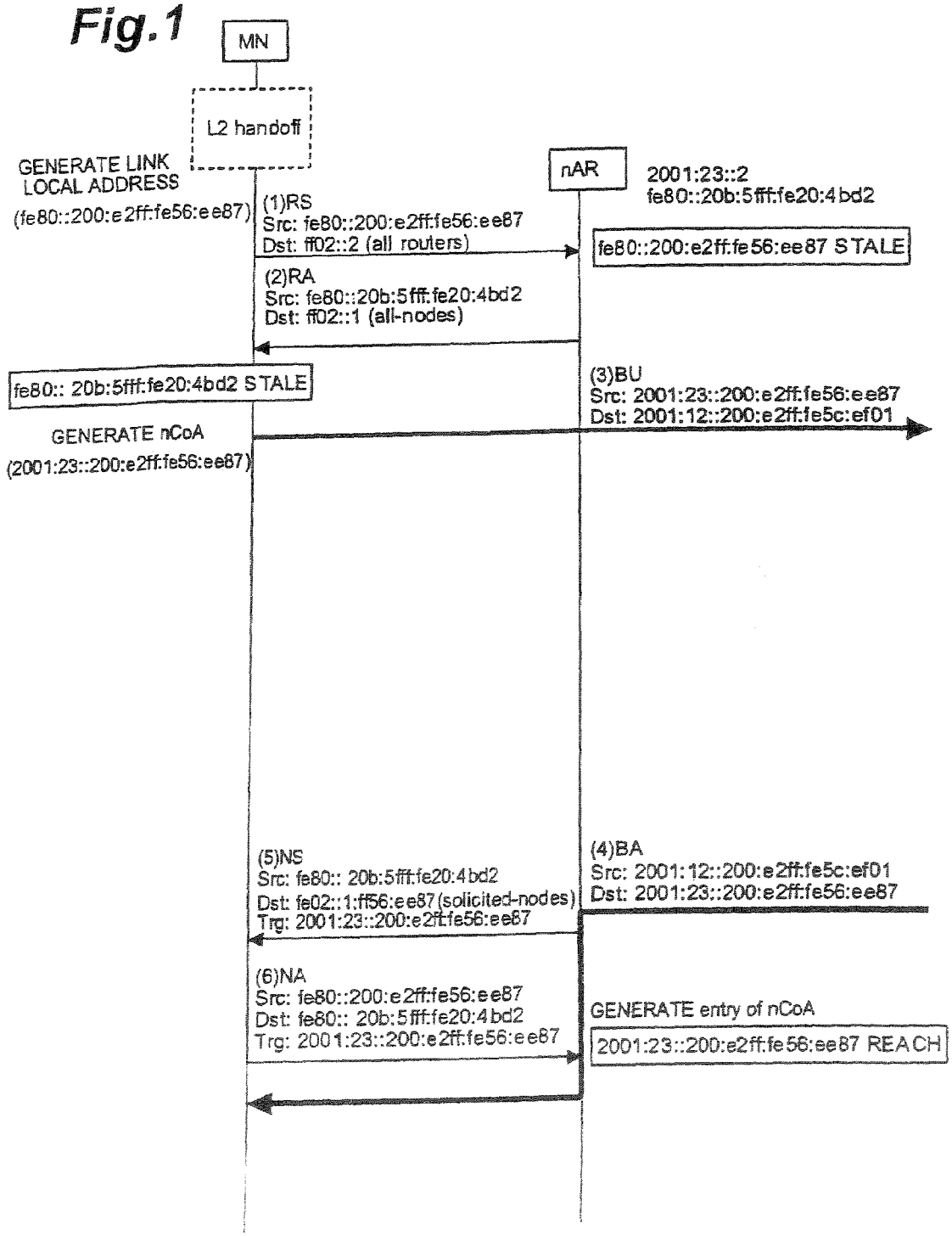
FIG. 1 is a sequence chart showing operation at the time of handoff at a conventional technology.
Figure 2:
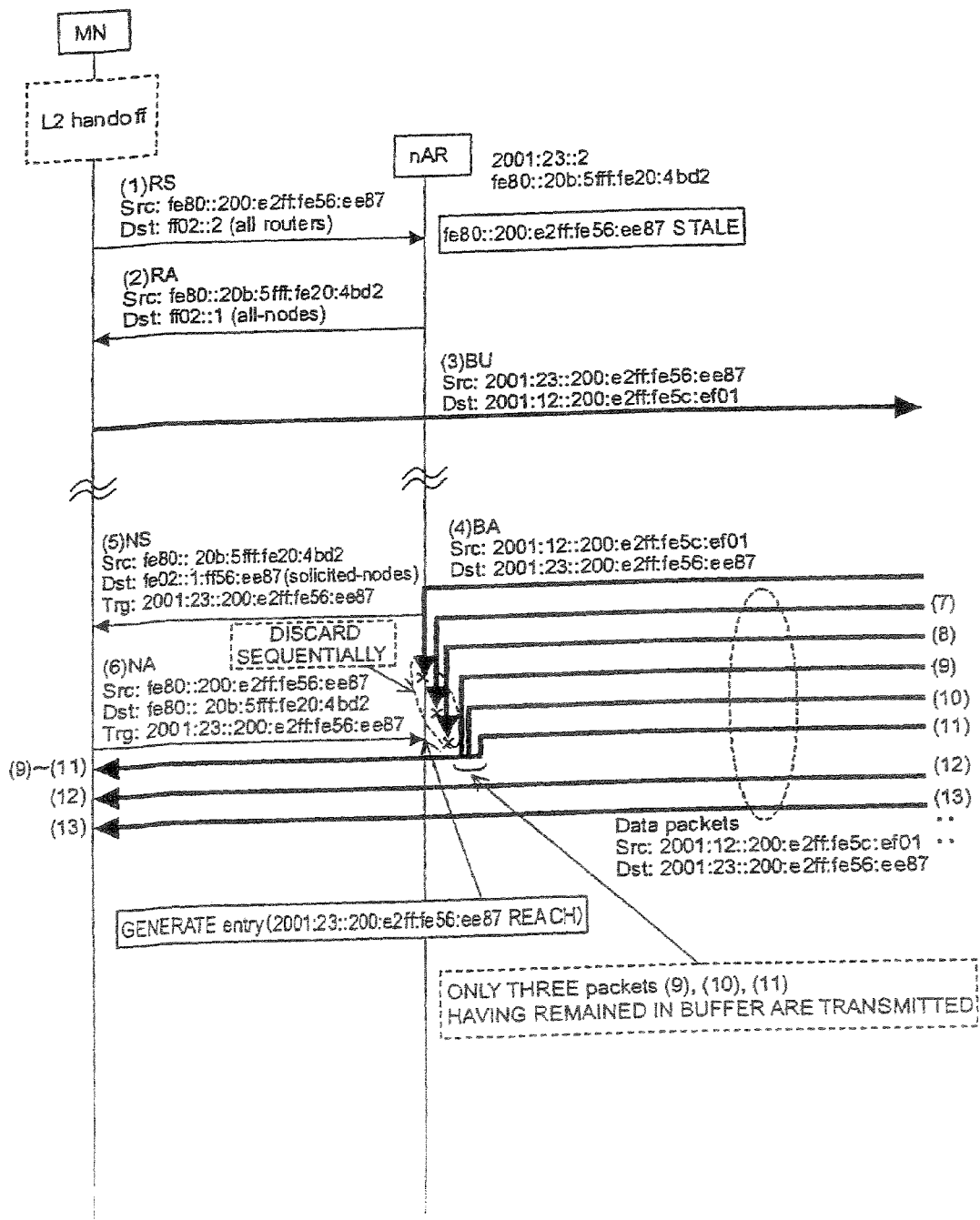
FIG. 2 is a sequence chart showing the generation of packet transmission delay and packet loss by temporary buffering at the conventional technology.
Figure 3:
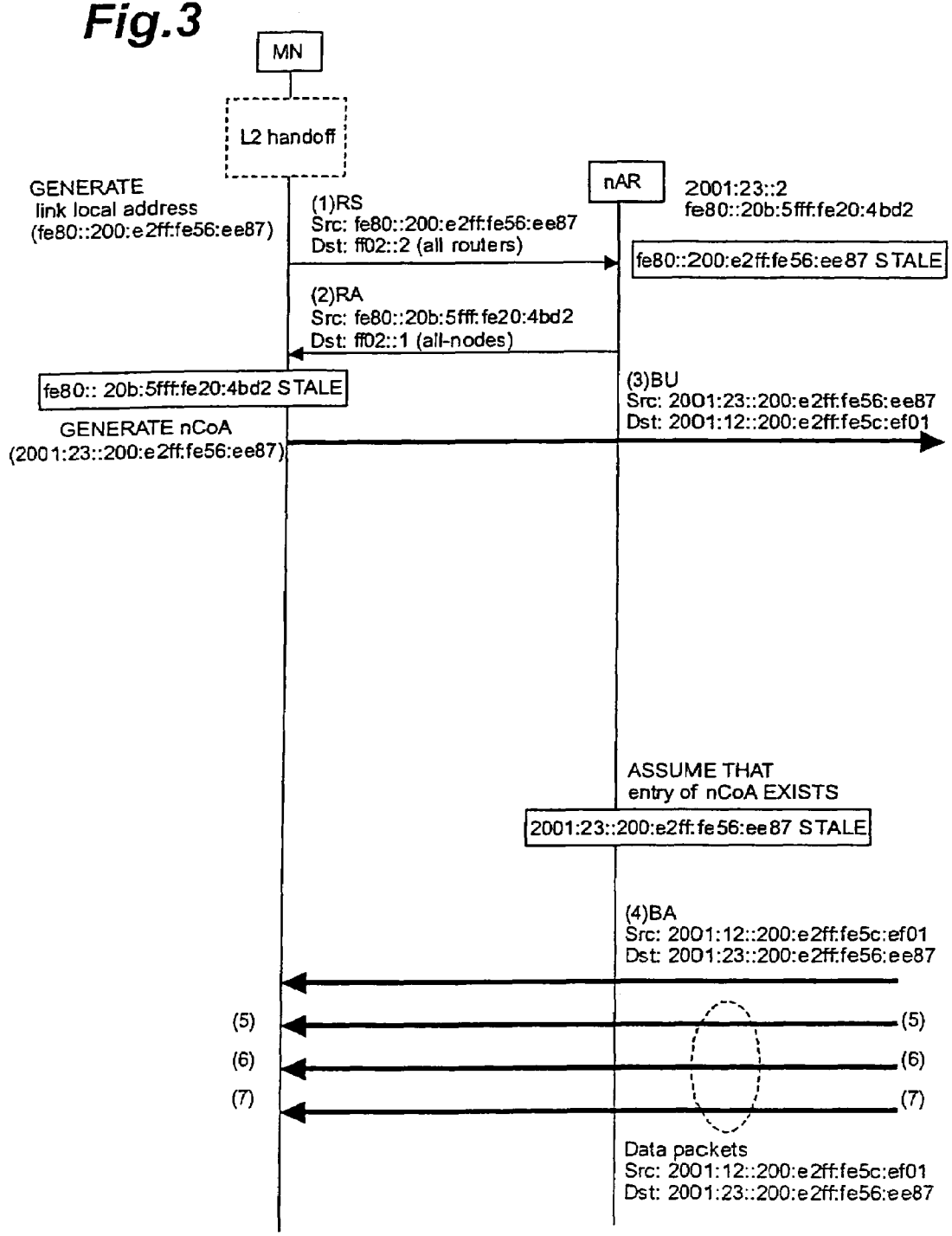
FIG. 3 is a sequence chart in the case where it is assumed that the neighbor cache entry of a new care of address (nCoA) has already existed at the time when binding advertisement (BA) arrives at a new access router (nAR).

Referring now to the drawings, various embodiments of the present invention are explained.

First Embodiment

In case of the first embodiment of the present invention, description will be given of an embodiment, are applied to an MN based on the Mobile IPv6 describing in the non-patent document 1.

Figure 6:
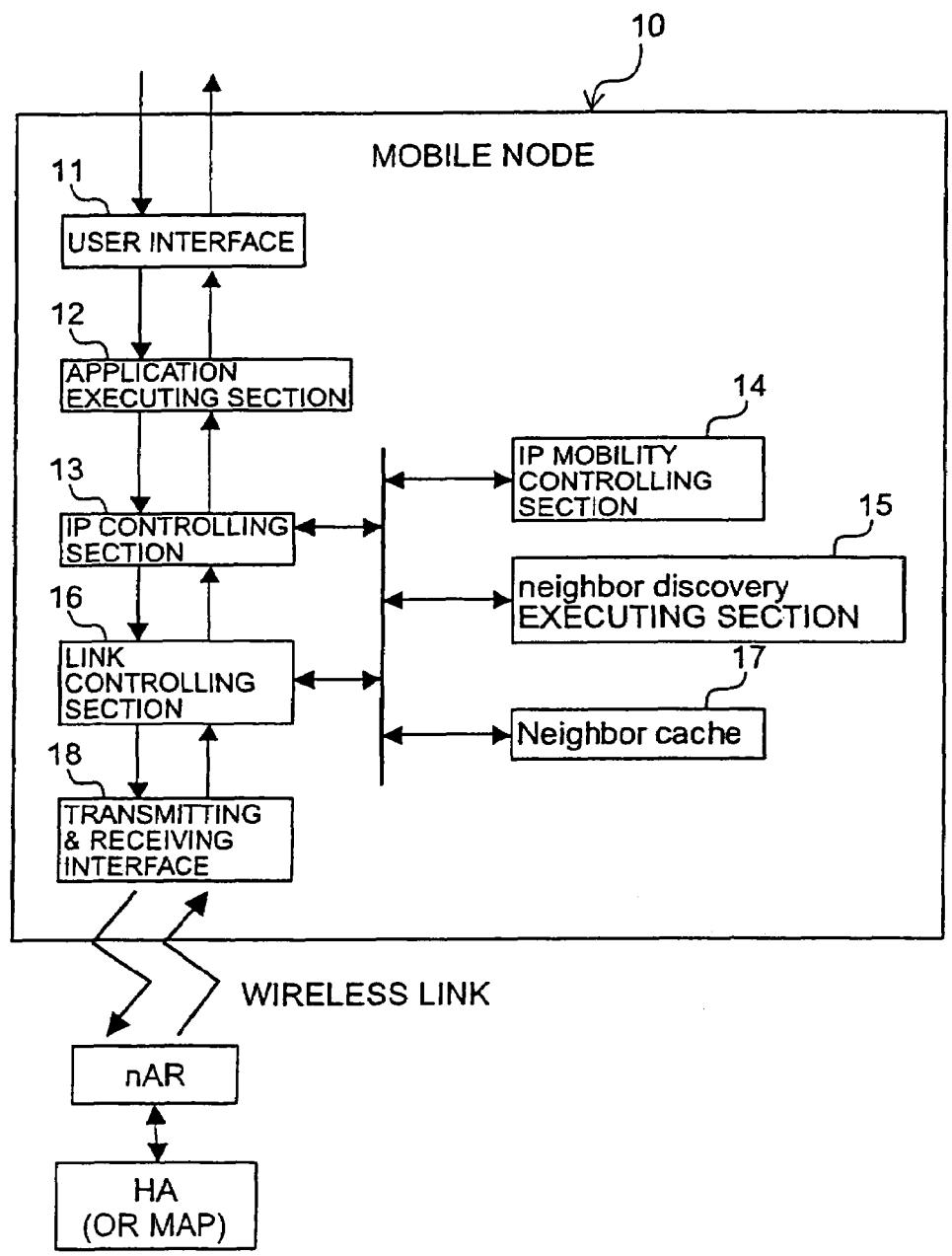
FIG. 6 is a block diagram showing a functional structure of a mobile node (MN) and a structure of a mobile communication system at the first and second embodiments of the present invention.

FIG. 6 is a block diagram showing a functional structure of an MN 10 and a structure of a mobile communication system at the first embodiment of the present invention. As shown in FIG. 6, the MN 10 is configured to be provided with a user interface 11, an application executing section 12, an IP controlling section 13, an IP mobility controlling section 14, a neighbor discovery executing section 15, a link controlling section 16, a neighbor cache 17, and a transmitting and receiving interface 18.

The user interface 11 is an interface on which a user operates the application executing section 12. The application executing section 12 is a constituent for executing applications, the IP controlling section 13 is a constituent for executing communication control of the IP layer, and the link controlling section 16 is a constituent for executing communication control of a link layer. Data, which the application executing section 12 transmits to other node, are transmitted to a wireless link via the IP controlling section 13, the link controlling section 16, and the transmitting and receiving interface 18. On the contrary, data, which have been transmitted to the application executing section 12 from the other node, are received by the application executing section 12 via the transmitting and receiving interface 18, the link controlling section 16, and the IP controlling section 13.

The IP mobility controlling section 14 is a constituent for executing mobility control based on the mobile IPv6, and processes packets (BU and BA) for executing the mobility control. The neighbor discovery executing section 15 processes packets (NS, NA, etc.) for executing the neighbor discovery stipulating in the RFC2461. Furthermore, as shown in FIG. 9, in the neighbor cache 17, the neighbor cache entry showing the correspondence between the IP address and the MAC address has been stored.

The link controlling section 16 attaches a suitable MAC address corresponding to the destination IP address to an IP packet received from the IP controlling section 13, by referring to the neighbor cache 17, and transmits the IP packet with the attached MAC address to the transmitting and receiving interface 18. Herewith, the neighbor cache entry stored in the neighbor cache 17 is updated to the latest information by the neighbor discovery executing section 15.

In the first embodiment of the present invention, the operation of the IP mobility controlling section 14 and the neighbor discovery executing section 15 mentioned hereinafter constitutes characteristic features. That is, the IP mobility controlling section 14 gives an NS transmitting command to the neighbor discovery executing section 15, right after the IP mobility controlling section 14 has generated the BU addressed to the HA and transmitted the generated BU to the HA via the IP controlling section 13. The neighbor discovery executing section 15 having received this NS transmitting command generates an NS. And after the source address has been set to be an nCoA and the destination address has been set to be a default router, the neighbor discovery executing section 15 transmits the generated NS to the wireless link via the link controlling section 16 and the transmitting and receiving interface 18.

Figure 4:
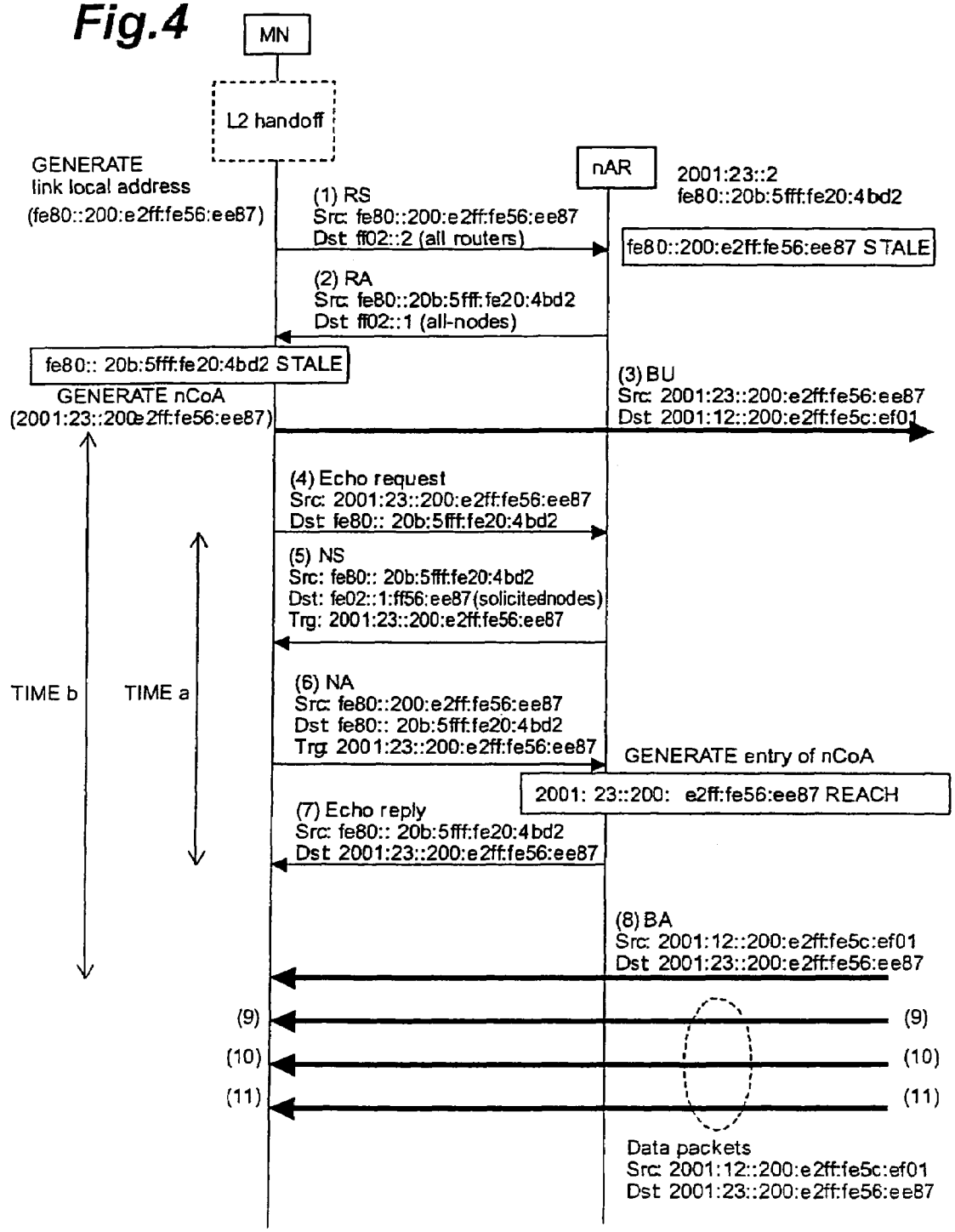
FIG. 4 is a sequence chart showing operation at the time when an MN executes handoff from an old access router (oAR) (not shown) to a nAR at a first embodiment of the present invention.

FIG. 4 is a sequence chart showing operation at the time when an MN executes handoff from an oAR (not shown) to a nAR at the first embodiment of the present invention. Referring to FIG. 4, the operation at the first embodiment of the present invention is explained.

After the handoff of the MN, the MN transmits the (1) RS requesting the nAR to transmit the RA, whereupon, when the MN has received the (2) RA from the nAR, the MN generates a new care of address nCoA on a new link, (for example, 2001:23::200:e2ff:fe56:ee87). And the MN transmits the (3) BU addressed to the HA and informs the HA about the generated nCoA. Herewith, the address of the HA is set to be "2001:12::200:e2ff:fe5c:ef01".

At this time, right after the MN has transmitted the (3) BU addressed to the HA, the MN transmits a (4) echo request, in which the source address is set to be the nCoA, to the nAR. This is the distinctive operation characteristic of the present invention.

The nAR having received the (4) echo request intends to transmit an echo reply to the nCoA being the source address of the echo request. This operation is the operation based on the RFC2463 (described in the non-patent document 4). However, at this time, the neighbor cache entry related to the nCoA does not exist in the neighbor cache of the nAR. Therefore, the nAR transmits the (5) NS to the MN and receives the (6) NA from the MN, and generates the neighbor cache entry of the nCoA (refer to FIG. 9). This operation is the operation based on the RFC2461. And the nAR transmits the (7) echo reply to the MN corresponding to the generated neighbor cache entry.

At this time, the time required from the transmission of the (4) echo request by the MN to the transmission of the (7) echo reply by the nAR ("time a" in FIG. 4) is considered to be shorter than the time required from the transmission of the (3) BU by the MN to the arrival of the (8) BA at the nAR ("time b" in FIG. 4). The reason for this is as follows. That is, while the transmission of the (3) BU and the reception of the (8) BA is communication between the MN and the HA via many nodes, the transmission of the (4) echo request and the reception of the (7) echo reply is communication between the MN and the nAR being the neighbor node.

Consequently, as shown in FIG. 4, the (8) BA and the data packets (9) to (11) arriving at the nAR following the (8) BA are transferred to the MN without buffering in the nAR, corresponding to the neighbor cache entry of the nCoA generated at the time when the (7) echo reply has been transmitted. As a consequence, the increase of the transmission delay and the occurrence of the packet loss caused by the generation of the neighbor cache entry in the nAR can be avoided.

In the first embodiment of the present invention, the MN requested the nAR to transmit the (2) RA by transmitting the (1) RS, however, this is not absolutely necessary, and the MN can receive the (2) RA, which the nAR transmits periodically without transmitting the (1) RS.

Also, in the first embodiment of the present invention, the present invention is applied to the IPv6, however, the same effect can be obtained by applying the present invention to the mobile IPv4 of the co-located mode described in the document "IETF RFC2002 Mobile IPv4".

Second Embodiment

At the second embodiment of the present invention, an embodiment, is applied to an MN based on the Mobile IPv6 describing in the non-patent document 1, is explained. Herewith, in the second embodiment, the functional structure of the MN 10 and the structure of the mobile communication system are the same at the first embodiment shown in FIG. 6, therefore, the same explanation is omitted.

Figure 5:
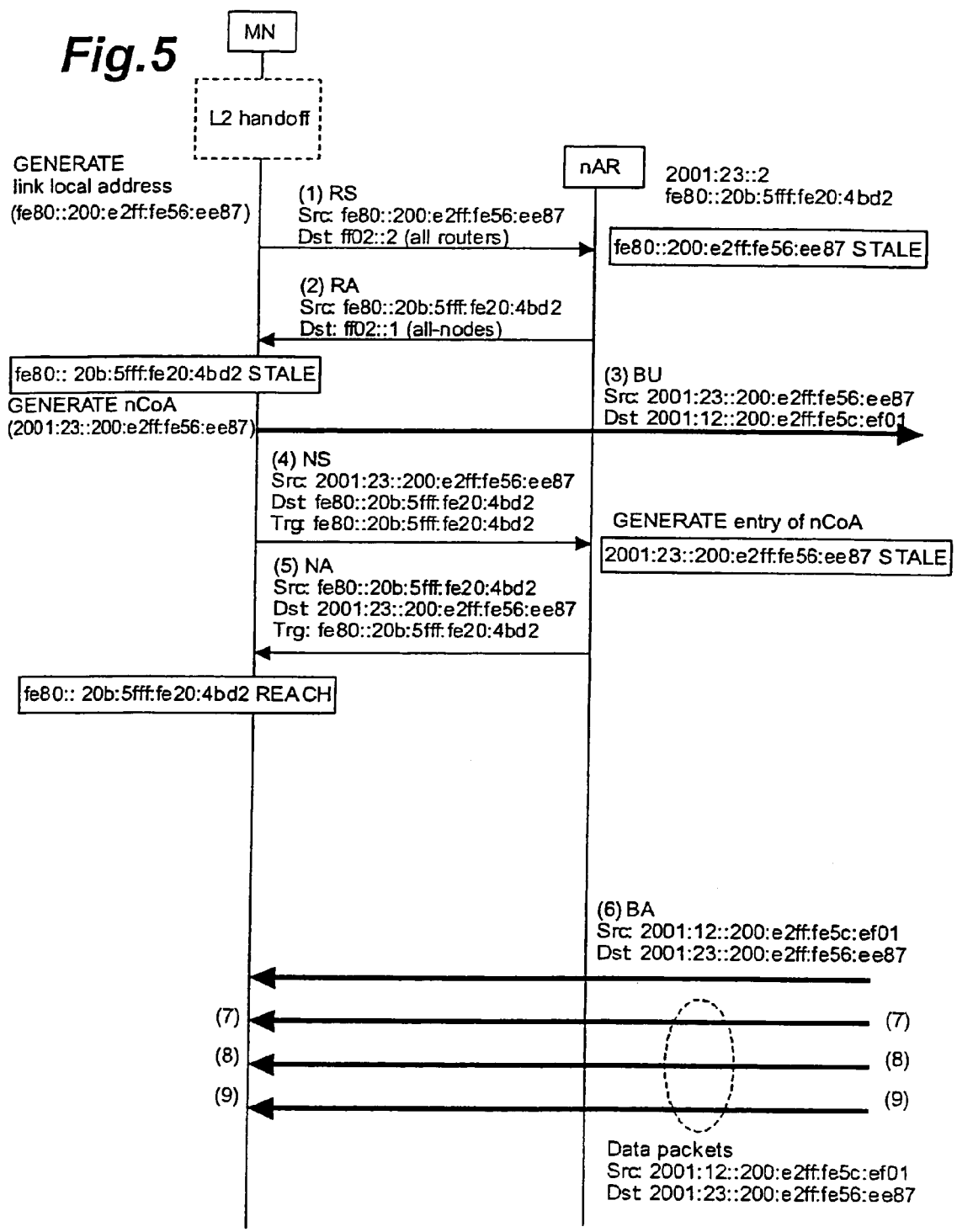
FIG. 5 is a sequence chart showing operation at the time when an MN executes handoff from an oAR (not shown) to a nAR at a second embodiment of the present invention.

FIG. 5 is a sequence chart showing operation at the time when an MN executes handoff from an oAR (not shown) to a nAR at the second embodiment of the present invention. Referring to FIG. 5, the operation in the second embodiment of the present invention is explained.

After the handoff of the MN, the MN transmits the (1) RS requesting the nAR to transmit the RA, and when the MN having received the (2) RA from the nAR, the MN generates a new care of address nCoA on a new link, (for example, 2001:23::200:e2ff:fe56:ee87). And the MN transmits the (3) BU addressed to the HA and informs the HA about the generated nCoA. Herewith, the address of the HA is set to be "2001:12::200:e2ff:fe5c:ef01".

Herewith, right after the MN transmitted the (3) BU addressed to the HA, the MN transmits a (4) NS in which the source address is set to be the nCoA to the nAR. This is the specific operation of the present invention.

The nAR generates the neighbor cache entry of the nCoA (refer to FIG. 9) by receiving this (4) NS. This operation is the operation based on the RFC2461. And the nAR transmits the (5) NA to the MN.

Consequently, as shown in FIG. 5, the (6) BA and the data packets (7) to (9) arriving at the nAR following the (6) BA are transferred to the MN without buffering in the nAR, corresponding to the neighbor cache entry of the nCoA generated at the time when the (4) NS has been received. Thereby, the increase of the transmission delay and the occurrence of the packet loss caused by the generation of the neighbor cache entry in the nAR can be avoided.

As the same as at the first embodiment of the present invention, at the second embodiment of the present invention, the MN requested the nAR to transmit the (2) RA by transmitting the (1) RS, however, this is not absolutely necessary, the MN can receive the (2) RA which the nAR transmits periodically without transmitting the (1) RS.

Third Embodiment

At the third embodiment of the present invention, an embodiment, is applied to an AR based on the Mobile IPv6 describing in the non-patent document 1, is explained.

Figure 7:
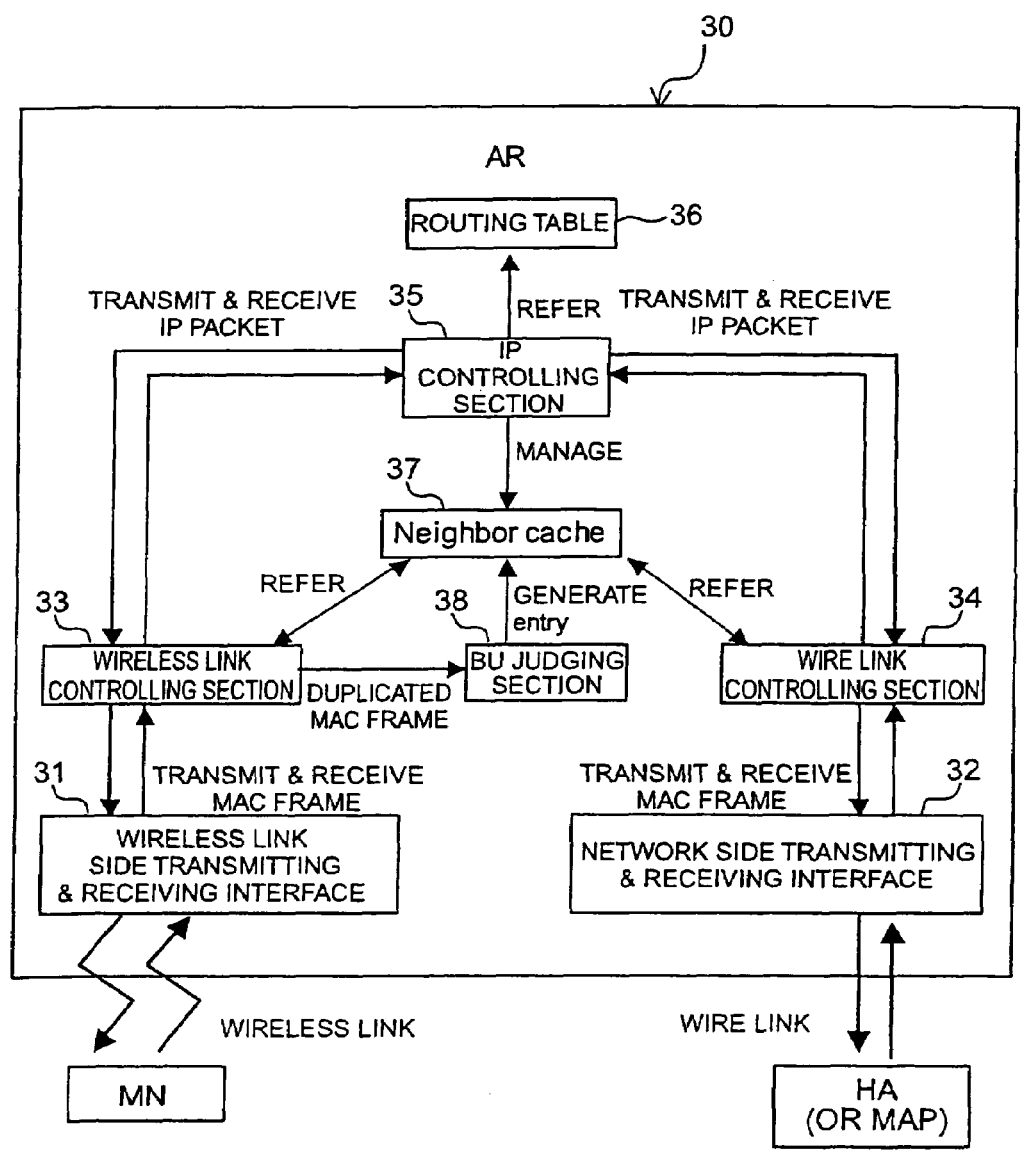
FIG. 7 is a block diagram showing a functional structure of an access router (AR) and a structure of a mobile communication system at a third embodiment of the present invention.

FIG. 7 is a block diagram showing a functional structure of an AR 30 and a structure of a mobile communication system at the third embodiment of the present invention. As shown in FIG. 7, the AR 30 provides a wireless link side MN transmitting and receiving interface 31, a network side transmitting and receiving interface 32, a wireless link controlling section 33, a wire link controlling section 34, an IP controlling section 35, a routing table 36, a neighbor cache 37, and a BU judging section 38.

The wireless link controlling section 33 duplicates a frame received from the wireless link side MN transmitting and receiving interface 31, and sends one of the two frames obtained by the duplication to the BU judging section 38, and sends the other of the two frames to the IP controlling section 35 by removing its MAC header. And in the case where the wireless link controlling section 33 has received an IP packet from the IP controlling section 35, the wireless link controlling section 33 attaches the MAC header to the IP packet by referring to the neighbor cache 37, and transmits the IP packet with the attached MAC header to the wireless link via the wireless link side MN transmitting and receiving interface 31.

The wire link controlling section 34 removes the MAC header from the frame received from the network side transmitting and receiving interface 32, and sends the frame removed the MAC header to the IP controlling section 35. And in the case where the wire link controlling section 34 has received an IP packet from the IP controlling section 35, the wire link controlling section 34 attaches the MAC header to the IP packet by referring to the neighbor cache 37, and transmits the IP packet with the attached MAC header to the wireless link via the network side transmitting and receiving interface 32.

The IP controlling section 35 judges whether the IP packet received from the wireless link controlling section 33 or the wire link controlling section 34 is sent to the wireless link or the wire link, by referring to the routing table 36. And the IP controlling section 35 sends the IP packet to the section in the wireless link controlling section 33 or the wire link controlling section 34 based on the judgment. And also the IP controlling section 35 manages the neighbor cache 37 by executing the process of the ICMP packet regarding the neighbor discovery based on the RFC2461.

As shown in FIG. 9, the neighbor cache 37 stores the correspondence between the IP address and the MAC address of the neighbor node as the neighbor cache entry.

The BU judging section 38 judges the BU by the next header number check and the type field check of the mobility header, and generates the correspondence between the IP address and the MAC address of the MN. And this correspondence is set to be the neighbor cache entry and the neighbor cache entry is stored in the neighbor cache 37.

At the third embodiment of the present invention, the frame duplication function of the wireless link controlling section 33 and the all functions of the BU judging section 38 are features of the present invention.

Figure 8:
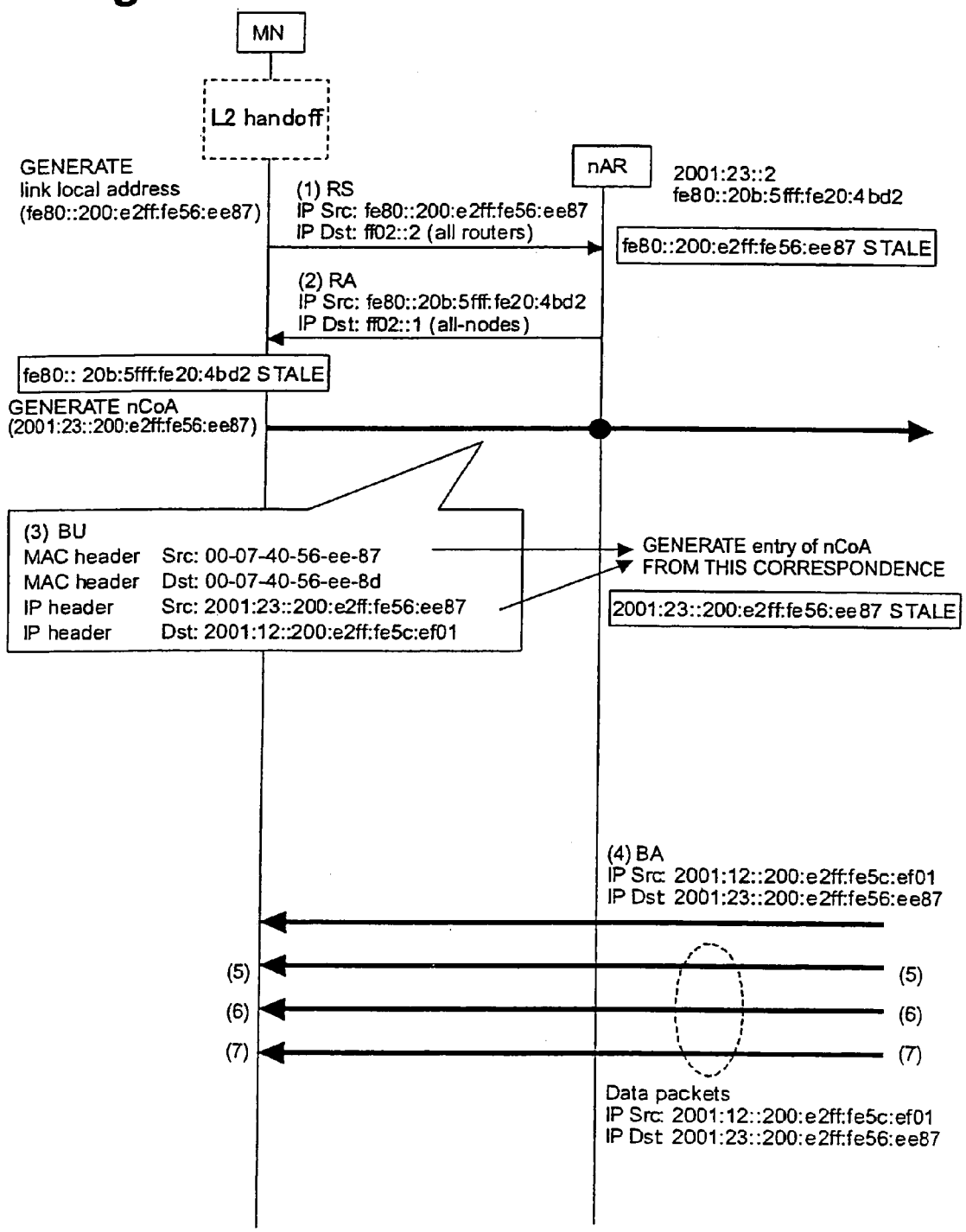
FIG. 8 is a sequence chart showing operation at the time when an MN executes handoff from an oAR (not shown) to a nAR at the third embodiment of the present invention.

FIG. 8 is a sequence chart showing operation at the time when an MN executes handoff from an oAR (not shown) to a nAR at the third embodiment of the present invention. Referring to FIG. 8, the operation at the third embodiment of the present invention is explained. At the third embodiment of the present invention, the wireless link provided by the nAR is a wireless LAN based on the IEEE802.11.

After the handoff of the MN, the MN transmits the (1) RS requesting the nAR to transmit the RA, and when the MN has received the (2) RA from the nAR, the MN generates a new care of address. nCoA on a new link, (for example, 2001:23:: 200:e2ff:fe56:ee87). And the MN transmits the (3) BU addressed to the HA and informs the HA about the generated nCoA. Herewith, the address of the HA is set to be "2001: 12::200:e2ff:fe5c:ef01".

When this BU is relayed, at the AR, the BU judging section 38 recognizes that the packet is the BU by the next header number check and the type field check of the mobility header.

Herewith, a method, which the AR recognizes that the relay packet is the BU, is explained. The AR sequentially checks the next header number from the head of the received IP packets. In the case where the next header number is a value showing the mobility header, the AR checks the type number describing in the type field in the mobility header. When the type number is "5" showing the BU, the AR recognizes that the packet is the BU. And the AR generates a new neighbor cache entry by making the correspondence between the MAC address of the MN storing in the source address field in the MAC header and the CoA of the MN storing in the source address field in the IP header. The state of this entry is set to be "STALE".

As explained above, the BU judging section 38 obtains the correspondence between the source MAC address and the source IP address, and this correspondence is generated as a new neighbor cache entry (refer to FIG. 9). And the BU judging section 38 stores this neighbor cache entry in the neighbor cache 37. This is the operation at the third embodiment.

Consequently, as shown in FIG. 8, the (4) BA and the data packets (5) to (7) arriving at the nAR following the (4) BA are transferred to the MN without buffering in the nAR, corresponding to the neighbor cache entry of the nCoA generated at the time when the (3) BU has been relayed. With this, the increase of the transmission delay and the occurrence of the packet loss caused by the generation of the neighbor cache entry in the nAR can be avoided.

As the same as at the first and the second embodiments of the present invention, at the third embodiment of the present invention, the MN requested the nAR to transmit the (2) RA by transmitting the (1) RS, however, this is not absolutely necessary, the MN can receive the (2) RA which the nAR transmits periodically without transmitting the (1) RS.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mobile communication system, comprising:
a new care of address generating unit configured to generate a new care of address based on a change in an access router providing a wireless link to said mobile node; and
an interface configured to generate an echo request message addressed to an access router to which said mobile node is newly connected and in which said generated new care of address is set to be a source address, and to transmit said echo request message to said access router to which said mobile node is newly connected,
wherein said echo request message requests a reply to a source node or requests to store the correspondence between an IP address and a MAC address of a source of its own packet, and
said access router comprising:
a memory configured to store the correspondence between an IP address and a MAC address of a mobile node being connected to said access router.

2. A communication control method, comprising:
generating a new care of address by a mobile node in case of a change in an access router providing a wireless link to said mobile node;
generating an echo request message addressed to an access router to which said mobile node is newly connected requesting a reply to a source in which said generated new care of address is set to be a source address, and transmitting said echo request message to said access router to which said mobile node has been newly connected,
wherein said echo request message packet requests a reply to a source node or requests to store the correspondence between an IP address and a MAC address of a source of its own packet; and
storing the correspondence between an IP address and a MAC address of said mobile node, where an access router, to which said mobile node has been newly connected, has received said echo request message from said mobile node or has relayed said reply addressed to said mobile node, by said access router.

* * * * *